(No Model.)                    2 Sheets—Sheet 1.
C. YOUNG.
SEED PLANTER AND FERTILIZER DISTRIBUTER.
No. 287,210.                    Patented Oct. 23, 1883.
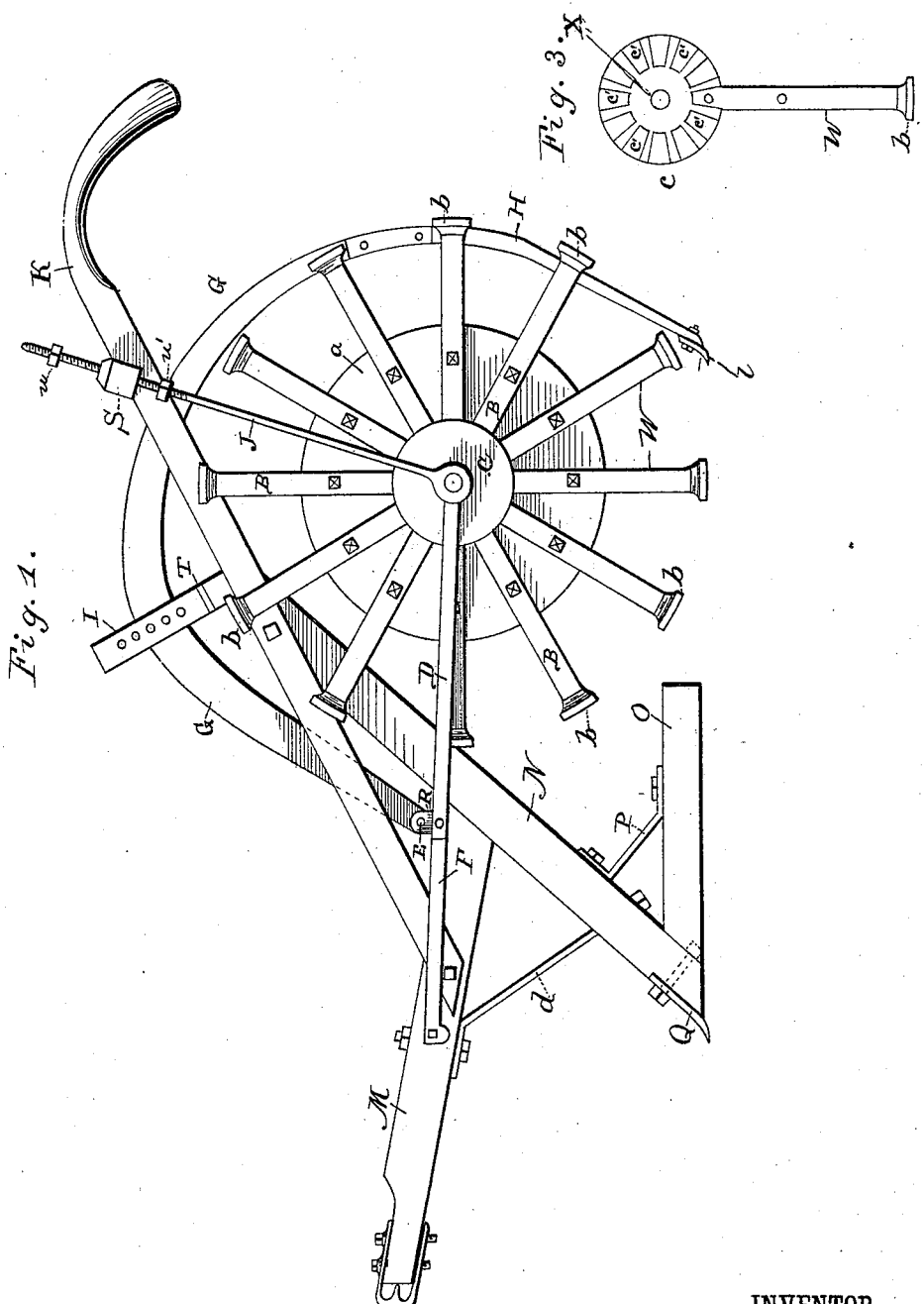
WITNESSES:
Thos. Houghton
W Read
INVENTOR.
Cornelius Young
By Munn & Co
ATTORNEYS.

(No Model.) 2 Sheets—Sheet 2.
C. YOUNG.
SEED PLANTER AND FERTILIZER DISTRIBUTER.
No. 287,210. Patented Oct. 23, 1883.
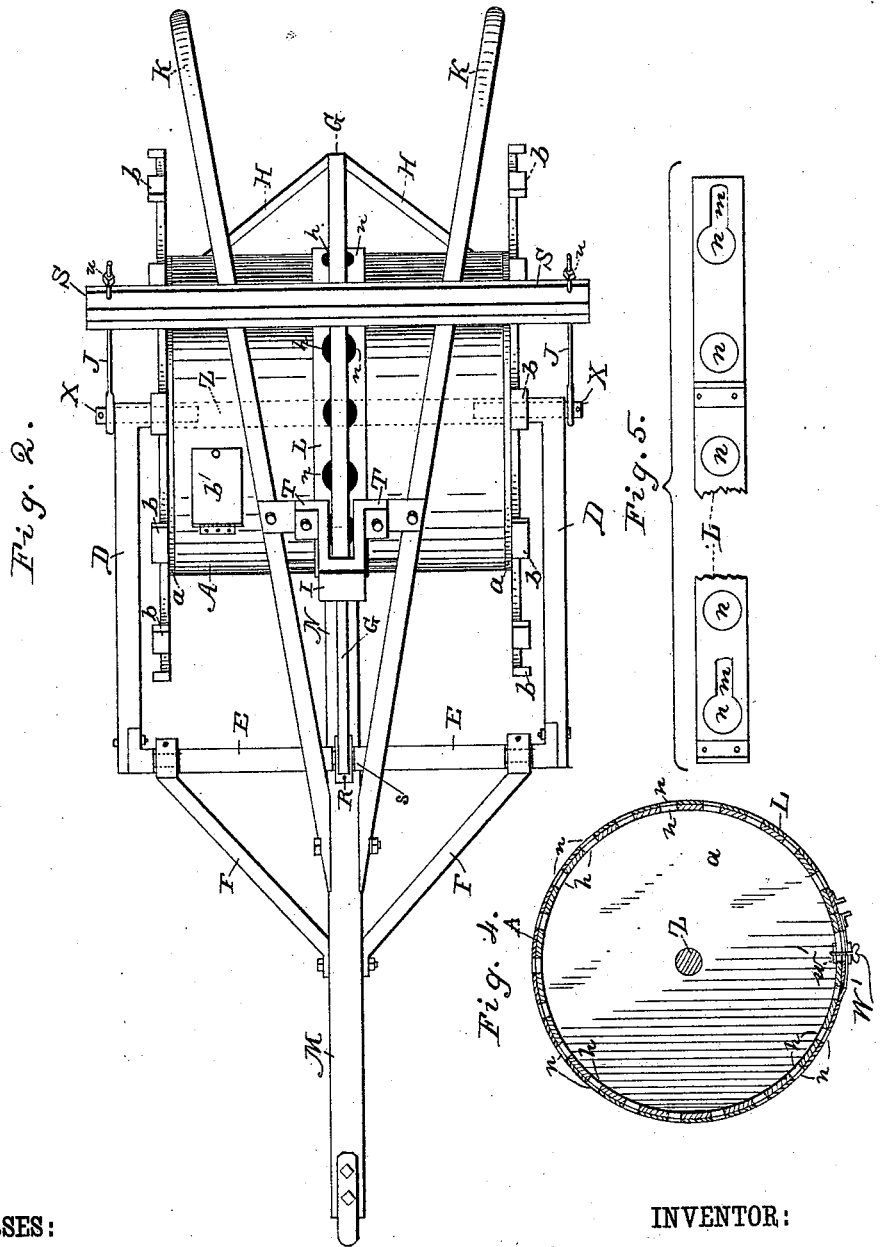

UNITED STATES PATENT OFFICE.

CORNELIUS YOUNG, OF SELMA, ALABAMA.

SEED-PLANTER AND FERTILIZER-DISTRIBUTER.

SPECIFICATION forming part of Letters Patent No. 287,210, dated October 23, 1883.

Application filed July 17, 1883. (No model.)

*To all whom it may concern:*

Be it known that I, CORNELIUS YOUNG, a citizen of the United States, residing at Selma, in the county of Dallas and State of Alabama, have invented a new and useful Improvement in Seed-Planters and Fertilizer-Distributers, of which the following is a specification.

Figure 1 is a side elevation of my improved seed-planter and fertilizer-distributer. Fig. 2 is a plan or top view of the same, and Figs. 3, 4, and 5 are detail views.

My invention relates to improvements in seed-planters and fertilizer-distributers; and it consists in the peculiar construction and arrangement of the parts, as hereinafter more fully described, and pointed out in the claims.

In the drawings, A represents a cylindrical or barrel-shaped seed and fertilizer distributing box or rotary hopper, which is suspended at each end or head *a* on a tireless wheel, W, composed of a series of spokes, B, each enlarged at its outer end at *b*, and attached to a hub, C, the tireless wheels W being secured to the heads *a* of the rotary hopper A in any convenient manner.

The spokes B of the tireless wheel may be secured to the hub C by inserting and driving their diminished inner ends into notches *c'*, made radially in the circumference of the hub *c*, and then bolting the latter and each spoke B to a head *a* of the rotary hopper A; or the hub C and spokes B may all be cast in one piece, and bolted or otherwise secured to the heads *a* of the rotary hopper A; or each head *a* of the rotary hopper and its tireless spokes and hub may be cast in one piece, integral with each other, and the heads connected by a sheet-metal cylinder or by a cylinder made of wood.

The hubs C have projections on each side. On the outside the projection is shown in the drawings at X. A similar projection passes through the head *a*, and the axle Z has a hole bored in each end, into which the projection on hub fits and secures axle Z in center of drum without any other fastening.

The rotary hopper A is provided, as shown, with an axle, Z, passing centrally through holes in the heads *a* of the rotary hopper A, and also having a series of circumferential openings, *h*, arranged around the middle of the hopper for the escape of seed or fertilizer from the rotary hopper A.

*b'* is an opening or door for the insertion of seed or fertilizer into the rotary hopper A, hinged to the latter and closed by a suitable fastening.

L represents a band provided with a series of circumferential openings, *n*, corresponding with the openings *h* in the hopper A, and is placed around the hopper A and over the holes *h*, and secured to it adjustably by lapping the ends of the band together and inserting a thumb-screw, W', through the slots *m m* and a hole in the hopper A.

On the inside of the rotary hopper A, opposite the screw W', a casting, *w'*, having a threaded hole is secured for the thumb-screw W', by which construction the band can be adjusted around the rotary hopper A, over the holes *h*, so as to regulate the amount of seed or fertilizer sown, by leaving the holes *h* in the drum entirely open, or partly open, or entirely closed, as desired. By closing the holes *h* in the rotary hopper A entirely by the band L, and then boring a few small holes in the hopper between the openings *h*, corn and peas and other seed may be dropped as desired. By stopping up some of the openings *h* in the rotary hopper, or by providing another band with holes at greater distances apart, cotton-seed can be dropped at such distances apart as may be desired.

M represents a plow-beam bolted to the standard N at its inner end. The standard N carries at its lower end the opener Q and furrow-opener O.

D D represent side pieces, E the front shaft or axle, and F F side braces extending from the axle E to the plow-beam M. The rotary hopper A is secured to the plow-frame by slipping the holes in the inner ends of side pieces, D D, over the projections X on hubs C C, and bolting pieces D D to the axle E, which has a bearing, *s*, in its middle, and is journaled in box R, which is bolted to the plow-beam M. This construction forms a secure frame, and the braces F F prevent any lateral movement of the hopper from the rotating of the axle E. The drum can thus pass over rough ground or obstructions easily, and can readily be adjusted vertically up and down without throwing the opener Q out of the ground or out of the row. The rotary hopper A having an independent movement from the opener Q makes it easy for the plowman to hold it on the bed.

If desired, the rotating axle E may be dispensed with, and a stationary bar may be substituted, with a guide on each end. Another similar cross-piece may be secured to the plow-beam M in front of and distant from E six or eight inches. The side pieces, D, may be made longer and be provided with holes in each end. Slip one end over X on hub, as heretofore, pass the other end through guide on end of cross-piece E, and slip end with hole over bearing on front cross-piece, and secure with washer and linchpin. The piece D, passing through guide on cross-piece E, prevents lateral motion of the parts, and, fitting over axle on end of front cross-piece, will allow drum to have vertical motion up and down, same as provided by use of rotating axle E.

The rotating axle E may be dispensed with, and a stationary piece may be substituted, if desired, and the side pieces, D, may be made in two pieces each, so as to form a hinge by placing one end into the other and fastening with a bolt. One end will be slipped over X on hub or drum-head, and the other end secured to front cross-piece. This arrangement will allow vertical motion of drum up and down, same as other plows. The hopper, rotating, agitates the seed and causes it to drop uniformly and reliably.

The tireless wheels W, formed of the spokes B, have a decided advantage over wheels formed with a tire. In sticky or stiff land, when wet, the mud will not choke up the tireless wheel, as it will the wheel with a tire. When the rotary hopper is rotating on the spokes, it shakes and agitates the seed more than the wheel with a tire, and causes the seed to be dropped more uniformly.

G represents the bifurcated iron coverer-beam, to which the plow-feet H H are bolted, and carrying at their lower ends the covering-plows l l. This bifurcated covering-beam G is hinged at its forward end by a bolt passing through the projections on the box R, and through a hole in the end of the beam, and is secured from lateral motion by passing through the U-shaped guard I, having horizontal lower end pieces, T, secured to the handles K, and also by the lifting-rods J J, causing the covering-beam always to be in a direct line with the furrow-opener O and opener Q. I provide that disks may be attached to plow-feet H and substituted for plows l l, if desired. I know disks have been used as coverers, but not attached as I propose. By this construction, in ordinary lands, the covering-plows l l cover from the weight of the beam G and plow-feet H and plows l. In very rough land it may be necessary to insert a bolt through the holes in the U-shaped guard I, to hold the beam G down to its work.

The lifting-rods J J are provided with holes at their lower ends, which are made to fit over the lower outer ends of the projections X X in the hubs C, and secured thereto by linchpins. The inner ends of the projections X X are mortised into the ends of the axle Z of the revolving hopper A.

The upper ends of the lifting-rods J pass through the bar S, secured transversely to the handles K, and project beyond them at both sides, and are threaded at their upper ends and provided with nuts $u$ $u'$. The lower nuts or stops, $u'$, prevent the plow-stock or any part of it from coming in contact with the revolving hopper A. At the end of a row, or at any time when it is necessary to raise the rotary hopper A from the ground, it can be done by raising the handles K K, when the bar S comes in contact with the upper stop, $u$, thus raising the revolving hopper A. The rods J J are also braces to prevent lateral motion of the parts.

The handles K are secured at their lower ends by a bolt to opposite sides of the plow-beam M, and by a round brace passing through the standard N. The furrow-opener O is triangular in shape, and when the opener Q breaks the ground the furrow-opener O forces the soil back and smooths the furrow, so that the seed will drop to its center and come up in a straight line.

P is a brace connecting the furrow-opener O with the standard N, and $d$ is a similar brace connecting the standard N with the plow-beam M. The box or bearing R for the axle E is provided with projections, to hinge the lower end of the coverer-beam G thereto, and is bolted to the plow-beam M.

I am aware that rotary hoppers have heretofore been employed in seed-planters, with a series of circumferential openings made in their middle for the discharge of seed; and I am aware that tireless wheels have heretofore been employed in seed-planters; and I am also aware that rotary seed-hoppers provided with a series of circumferential seed-openings in their middle, and covered by a band provided with openings which are moved in the direction of the axis of the hopper, have heretofore been employed to regulate the discharge of seed, and I therefore lay no claim, broadly, to such inventions.

Having thus fully described my invention, what I claim as new, and desire to secure by Letters Patent, is—

1. In a seed-planter and fertilizer-distributer, a metallic tireless wheel consisting of a hub, C, provided with a central projection, X, and spokes B, having enlarged outer ends, $b$, all cast in one piece, substantially as described, and for the purpose set forth.

2. In a seed-planter and fertilizer-distributer, the combination, with the revolving hopper A, provided with a series of circumferential holes, $h$, extending around the middle of the hopper, and axle Z, of tireless wheels, each provided with a hub, C, and spokes B, having enlarged outer ends, b, said tireless wheels being secured to the heads of the revolving hopper, substantially as described, and for the purpose set forth.

3. The combination, with the revolving hopper A, provided with the circumferential holes h, axle Z, and heads a, of the tireless wheels W, each provided with a hub, X, and spokes B, having enlarged outer ends, b, the hubs C and each spoke of the tireless wheel being bolted to the opposite head, a, of the hopper, and the projection X secured to the axle Z, substantially as described, and for the purpose set forth.

4. The combination, with the axle E and curved hinged bifurcated covering-beam G, having plow-feet H, provided with plows l, of the handles K K and U-shaped guard-piece I, provided with adjusting-holes and end pieces, T, substantially as described, and for the purpose set forth.

5. The combination, with the axle E, provided with the bearing R and hinged covering-beam G, revolving hopper A, and tireless wheels W, of the side pieces, D, handles K K, bar S, secured to the handles, and lifting-braces J J, threaded at their upper ends, and provided with the stops u u', substantially as described, and for the purpose set forth.

CORNELIUS YOUNG.

Witnesses:
R. W. YOUNG,
C. W. HOOPER.